Patented Oct. 8, 1946

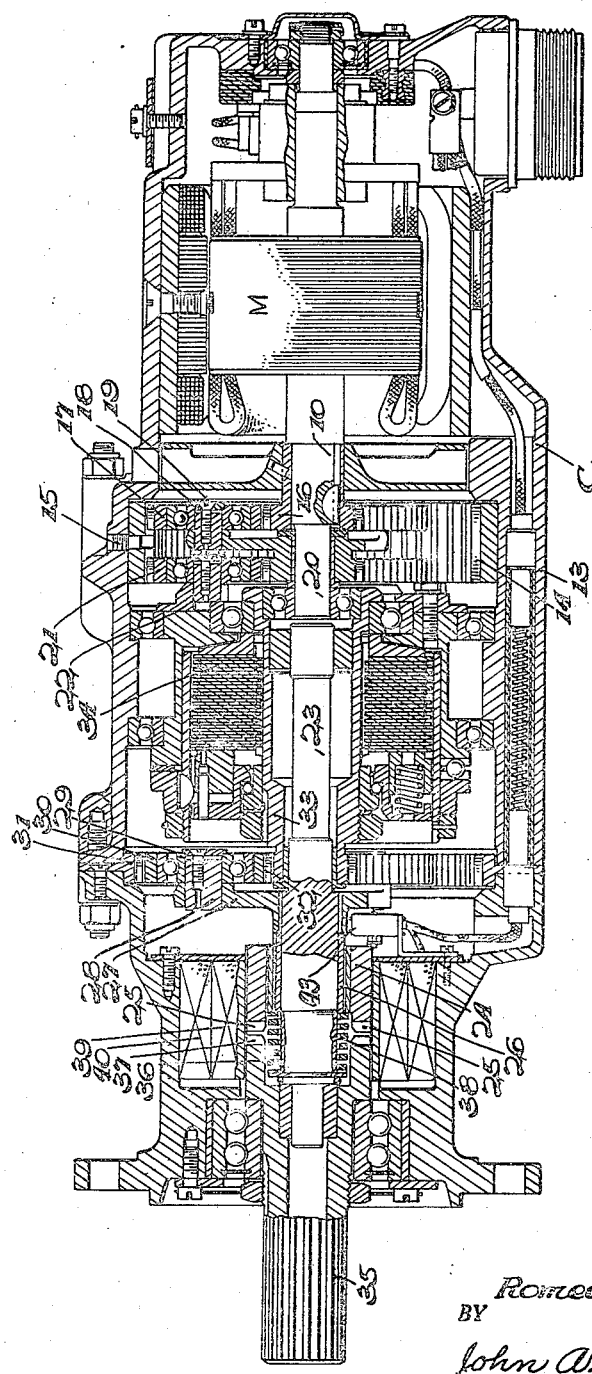

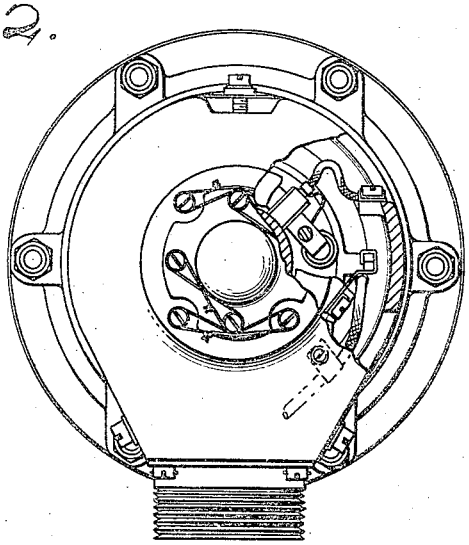
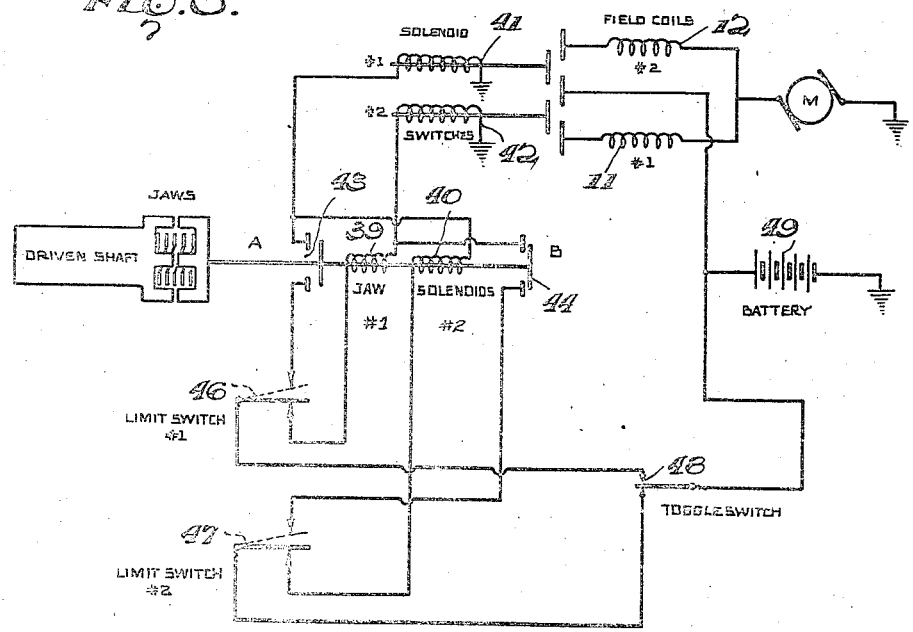

2,408,992

UNITED STATES PATENT OFFICE 2,408,992

LANDING GEAR ACTUATOR

Romeo M. Nardone, Teaneck, N. J., assignor to Bendix Aviation Corporation, Teterboro, N. J., a corporation of Delaware Application January 28, 1944, Serial No. 520,121

6 Claims. (Cl. 192—.02)

This invention deals with retractable landing gears and is concerned primarily with a unit employed to actuate such a gear.

In providing an actuator unit of this character, it has been the practice to employ a pair of complementary jaw clutch elements to control the delivery of power from the drive shaft of a motor to the output shaft.

With devices of this nature some little difficulty has been experienced in maintaining the jaw clutch elements in proper interfitting relation. Due to this difficulty, certain designs of the interfitting teeth have been proposed which assure of a secure interlock; but when these types of jaws are employed, the interlock has not been quickly broken at the proper time and the jaws have remained in engagement for a longer period than intended, thus overrunning has developed which is a highly undesirable factor.

In view of these difficulties which have attended the use of interfitting jaw clutch elements, attempt has been made to utilize a brake to control the delivery of power between the drive shaft and the output shaft. However, this practice also presents certain disadvantages.

In the interests of safety, it is recognized as conventional and well-accepted practice to employ a pair of these actuator units, one of which remains idle but is held available to be brought into operation should the first unit fail. With both actuator units operatively connected to the landing gear mechanism and with a failure due to jamming of any part of the driving mechanism, such as in the gears, friction clutch assembly or brake, the second unit also is rendered inoperative. Thus the very purpose of the second unit is defeated in that it will not be available to operate the retractable landing gear when the first unit fails.

With these conditions in mind, this invention has in view as an objective the provision of an actuator unit which includes the old and accepted interfitting jaw clutch elements, but which unit is provided with means which insures of an instant stoppage of all parts when a cycle of operation is completed and with a complete elimination of any over-travel.

A further object is the provision of an actuator unit of the character aforesaid, which provides for a prompt and instantaneous engagement of the jaw clutch elements at the proper time.

With an actuator unit designed in accordance with these objectives, any failure, either mechanical or electrical, in one actuator unit, in no way affects the standby unit which is at all times available for substitute use.

In carrying out these ideas in a practical embodiment, the so-called fixed jaw clutch element is drivably secured to the output shaft, while the movable or sliding clutch element is keyed or splined to a shaft that is operatively connected to the drive shaft of a motor by a planetary train.

A pair of solenoids are co-axially arranged to control movement of the sliding jaw clutch, and these solenoids are, of course, included in the electrical circuit, which also embodies as essential elements solenoid switches for controlling delivery of current to the field coils of the motor. When one of these coils is energized, the drive shaft of the motor is driven in one direction and with current supplied to the other field coil, rotation in the reverse direction is obtained. A pair of contacts which also controls delivery of current to the field coils is subject to being made or broken by movement of the sliding jaw clutch.

With the actuator unit, including the parts and circuit, as above indicated, movement of the main control switch into position for causing operation of the unit in one direction completes the circuit through one of the limit switches, which is included as a part of the plane construction and energizes the jaw solenoid and also one of the solenoid switches. As the jaw solenoid becomes effective the sliding jaw is moved into interfitting engagement with its complementary jaw and one of the contacts associated with this jaw is completed, although current at this time is not delivered through these contacts. As the solenoid switch is operated, one of the field coils is energized to cause operation of the motor to drive the shaft in one direction.

After a predetermined cycle of operation is completed, such as a given number of revolutions of the output shaft, the limit switch is affected to cause operation of the solenoid switch and discontinue the delivery of current to the field coil which has been energized. At the same time, the circuit through the contacts is completed to cause energizing of the other field coil which tends to operate the motor in an opposite direction for a brief interval. This causes substantially instantaneous stoppage of the motor. At the same time that the motor stops, the jaw clutches are disengaged, which breaks the contacts and discontinues the delivery of current to the second field coil.

Various other more detailed objects and advantages of the invention such as arise in connection with carrying out the above noted operations and a practical embodiment will in part become apparent, and in part be hereinafter stated as the description of the invention proceeds.

For a full and more complete understanding of the invention, reference may be had to the following description and accompanying drawings wherein:

Fig. 1 is a view taken as a sectional showing through an actuator unit made in accordance with the precepts of this invention;

Fig. 2 is an end elevational showing with the parts broken away; and

Fig. 3 is a diagrammatic illustration of the wiring system.

Referring now to the drawings and first more particularly to Fig. 1, an electric motor which constitutes the prime mover of the actuator unit is referred to generally by the reference character M. The motor M includes a drive shaft 10 and is energized by either of a pair of field coils 11 or 12. These coils are also represented in the wiring diagram of Fig. 3.

The motor M, together with the other mechanisms making up the actuator unit, is housed in a casing which is identified as C. This casing C includes a main central or intermediate portion which is slightly enlarged as compared to the end portions and which is generally of cylindrical formation. This intermediate casing part is designated 13. At the end adjacent to the motor M, the cylinder casing part 13 carries on its inner wall an internally toothed gear annulus 14. This gear annulus is intended to be fixed with respect to the casing and this relation may be obtained in any preferred manner as by the set screws indicated at 15.

Drivably carried by the drive shaft 10 of the motor is a sun gear 16. Meshing with the sun gear 16 and also with the internal teeth of the gear annulus 14 are a plurality of planet gears 17. The planet gears 17 may be three in number. Each of the planet gears 17 is formed with a hub 18 and received in each of the hubs 18 is a stub shaft 19 that is carried by, and in offset radial relation to, a sun gear 20 that is mounted for free rotation on a reduced continuation of the drive shaft 10. Meshing with the sun gear 20 and also with the internal teeth of the gear annulus 14 are a plurality of planet gears 21, which generally correspond to the planet gears 17. These planet gears 21 also have hubs which receive stub shafts that are carried by a circular plate 22.

The reduced extremity of the drive shaft 10 is appropriately journaled in this plate 22 and another shaft 23 is also suitably journaled for free rotation therewithin. At one end the shaft 23 carries a jaw clutch element 24 having teeth 25. This jaw clutch element 24 is mounted for sliding movement on the shaft 23, being keyed thereto by the splines represented at 26. Also keyed to the shaft 23, to establish the driving relation, is an end plate 27 which carries stub shafts 28. These stub shafts 28 are received in hubs 29 formed in planet gears 30, which planet gears correspond to the planet gears 17 and 21.

Another internally toothed gear annulus 31 is carried on the inner wall of the part 13 of the casing C and the planet gears 30 mesh with the teeth of the annulus. The gear annulus 31 is also fixedly secured to the casing.

Meshing with the planet gears 30 is a sun gear 32, which is formed as part of a sleeve 33. This sleeve 33, together with the sun gear 32, is assembled for free rotation about the shaft 23. Interposed between the sleeve 33 and the circular plate 22 are friction clutch elements 34 which are intended to establish a driving relation between these parts, but which permit of slippage when there is an overload on the output shaft. Friction clutch devices of this type are old and well known in this art.

It is evident that the planetary gear train above described provides for the transmission of power with a proper gear reduction from the drive shaft 10 of the motor M to the sliding jaw clutch element 24.

An output shaft is identified at 35 and it is this shaft which operates the retractable landing gear. The shaft 35 is appropriately journaled within an end part of the casing C and carried thereby is a fixed jaw clutch element 36 having teeth 37 that are complemental to, and in mesh with, the teeth 25. An expansion spring shown at 38 is interposed between the jaw clutch elements 24 and 36 and exerts a tendency normally tending to spread and disengage these elements.

A pair of co-axially arranged solenoids 39 and 40 are disposed about the sliding jaw 24 and are intended to cause and control the movement of this jaw clutch element. The solenoids 39 and 40 are represented in the wiring diagram of Fig. 3.

Referring now more particularly to Fig. 3, a solenoid switch for controlling delivery of current to the field coil 12 of motor M is represented at 41, while a similar solenoid operated switch 42 controls the delivery of current to the field coil 11. A set of contacts, which are made or broken, depending on the position of the sliding jaw 24, is represented at 43, and another similar set of contacts is shown at 44.

A pair of limit switches is indicated at 46 and 47, respectively. These limit switches will be carried as a part of the aircraft. Mechanism for causing operation of one or the other of these switches when a cycle of operation is complete will also be included as a part of the aircraft and will be connected up with the output shaft 35. A cycle of operation ordinarily depends on a predetermined number of revolutions of the output shaft.

Inasmuch as limit switches of this type, together with the cycle-determining mechanism which operates them, are well known in this art, they are not herein illustrated as it suffices to indicate the limit switches in the wiring diagram.

The main control in the form of a toggle switch is represented at 48 and an appropriate source of current is indicated by the battery at 49.

In outlining the modus operandi of the above-described actuating unit, it will be assumed that the limit switch 46 is in the gear down condition in which it has been left by the last operation of the unit. Thus when the toggle switch 48 is thrown up into position to operate the unit for retracting purposes, current will flow through the limit switch 46 and be delivered to the solenoid 39 and the solenoid switch 42. Thus the field coil 11 of the motor is energized to cause rotation of the drive shaft 10 in the proper direction and at the same time the sliding jaw clutch 24 is moved so that its teeth 25 interlock with the teeth 37 of the fixed jaw clutch 36. This completes the drive from the drive shaft 10 to the output shaft 35. As the jaw clutch 24 moves, it also makes the contacts 43, but the circuit of these contacts is not yet completed.

The unit will now operate during its prescribed cycle of operation until the limit switch 46 is affected by the cycle-determining mechanism. When this switch is operated, delivery of current to the solenoid 39 is discontinued, whereupon the spring 38 is rendered effective to disengage the teeth of the jaw clutch elements.

At the same time, i. e., before jaw clutch element 25 moves appreciably, the current to the field coil 11 is cut off, but the circuit of the contacts 43 which controls the delivery of current to the field coil 12 is completed. Thus the field coil 12 is energized and the tendency is to momentarily operate the motor in a reverse direction. This tendency causes a substantially instantaneous stoppage of the drive shaft 10. At the same time that the drive shaft is stopped, the jaw clutch elements are disengaged and movement of the sliding jaw clutch 24 breaks the contacts 43. Thus the circuit which has energized the field coil 12 is interrupted and both field coils of the motor are rendered completely inactive.

The operation of the landing gear in the opposite direction is believed to be obvious, but it may be noted that the toggle switch 48 will be moved into the opposite position. The limit switch 47 is now effective to deliver current to the solenoid 40 which actuates the sliding jaw 24. At the same time current is delivered to the solenoid switch 41 and the field coil 12 is energized to drive the motor in the proper direction.

As the jaw 24 moves, the contacts 44 are made. When the cycle of operation is completed, the limit switch 47 is operated to its dotted position with the result that no current is delivered to the solenoid 40 and the jaw clutch elements start to disengage. Delivery of current to the field coil 12 is cut off and the circuit of the field coil 11 is completed through the contacts 44 and this coil is energized to instantaneously stop the motor. As the jaws are disengaged, the contacts 44 are broken and the field coil 11 is no longer energized.

While only one embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. In an actuator for an air-craft remotely-controlled element which is movable between limits, a motor having a drive shaft and a pair of field coils, each of which is adapted to be energized to drive the motor in one direction, an output shaft, a jaw clutch element carried by said output shaft in driving relation, another jaw clutch element drivably connected to said drive shaft by a planetary gear train, one of said jaw clutch elements being movable, solenoid means for causing movement of said movable jaw element into clutch engaging position, spring means for disengaging said clutch elements, a solenoid switch associated with each of said field coils for controlling the delivery of current thereto, contacts included in the circuit of each field coil and which contacts are adapted to be made or broken by movement of said movable jaw, a pair of limit switches for controlling the delivery of current to said solenoid means and said solenoid switches and a main control switch, each of said limit switches being adapted to simultaneously discontinue the delivery of current to said solenoid means and affect said solenoid switches to shut off the current to its respective field coil and at the same time deliver current to the other field coil for a brief interval to quickly stop said drive shaft.

2. In a switch-governed actuator unit for an air-craft remotely-controlled element, a reversible motor having a drive shaft and a pair of field coils, each of which field coils is adapted to be energized by an operation of the switch to rotate the drive shaft in its respective direction, an output shaft for driving said element, a pair of complemental jaw clutch elements carried by said shafts for controlling the driving relation therebetween, one of said jaw clutch elements being movable, a solenoid for causing movement of said movable jaw clutch element when either of the field coils is energized, and means automatically operated when the first-named element is to be stopped for simultaneously de-energizing the then-effective field coil, energizing the other field coil, and initiating disengagement of the clutch, and for subsequently de-energizing said other field coil after a short interval adequate to substantially stop said motor.

3. In an actuator unit for an air-craft remotely-controlled element which is movable between limits, a reversible motor having a drive shaft and a pair of field coils, each of which is adapted to be energized to rotate the drive shaft in its respective direction, an output shaft for driving said element, a pair of complemental jaw clutch elements carried by said shafts for controlling the driving relation therebetween, one of said jaw clutch elements being movable, a solenoid for causing movement of said movable jaw clutch element, and means operatively connected with the first-named element to de-energize the then-effective field coil, to energize the other field coil and to initiate disengagement of the clutch when the first-named element nears a limit, and operatively connected with the movable jaw clutch element so that upon a movement thereof said other field coil is de-energized after a short duration adequate to substantially stop said motor.

4. In an actuator unit for an air-craft remotely-controlled element which is movable between limits, the combination of a reversible motor having a drive shaft and a pair of field coils, each of which is adapted to be energized to rotate the drive shaft in its respective direction, an output shaft, a pair of complemental jaw clutch elements carried by said shafts for controlling the driving relation therebetween, one of said jaw clutch elements being movable, a solenoid for causing movement of said movable jaw clutch element, and means operatively connected with the first-named element to de-energize the then-effective field coil, to energize the other field coil, and to initiate disengagement of the clutch when the first-named element nears a limit, and to de-energize said other field coil after a short interval adequate to substantially stop said motor.

5. In an actuator unit for an air-craft remotely-controlled element, the combination of a reversible motor having a drive shaft and a pair of field coils, each of which is adapted to be energized to rotate the drive shaft in its respective direction, an output shaft, a pair of complemental jaw clutch elements carried by said shafts for controlling the driving relation therebetween, one of said jaw clutch elements being movable, a solenoid for causing movement of said movable jaw clutch element, and means remotely automatically operated when the motor is to be stopped to de-energize the then-effective field coil, to energize the other field coil and initiate disengagement of the clutch, and to subsequently de-energize said other field coil after a short interval after the stated operation adequate to substantially stop said motor.

6. An actuating unit for an air-craft remotely-controlled element which is movable between limits, comprising a reversible motor and an output shaft, a pair of interfitting jaw clutch elements between said motor and shaft, manually operable means to engage said clutch elements and start said motor in operation, means for automatically disengaging said clutch elements and stopping said motor when a predetermined limit of operation is reached, and mechanism included as a part of said last mentioned means for causing said motor to tend to be operated in a reverse direction for a brief interval for quickly stopping the operation and to facilitate disengagement of said clutch elements.

ROMEO M. NARDONE.